United States Patent [19]
Waskiewicz

[11] Patent Number: 5,433,530
[45] Date of Patent: Jul. 18, 1995

[54] POLYMER BEARING HOUSING

[75] Inventor: Walter P. Waskiewicz, Bristol, Conn.

[73] Assignee: The Torrington Company, Torrington, Conn.

[21] Appl. No.: 269,947

[22] Filed: Jun. 30, 1994

Related U.S. Application Data

[63] Continuation-in-part of Ser. No. 954,774, Sep. 30, 1992, abandoned.

[51] Int. Cl.$^6$ .............................................. F16C 25/04
[52] U.S. Cl. .................................. 384/206; 384/208; 384/909
[58] Field of Search ............... 384/428, 434, 432, 909, 384/206, 208

[56] References Cited

U.S. PATENT DOCUMENTS

| | | | |
|---|---|---|---|
| Re. 32,595 | 2/1988 | Davies | 384/909 |
| 3,647,751 | 3/1972 | Darsow et al. | 384/909 |
| 3,873,167 | 3/1975 | Anderson . | |
| 3,936,099 | 2/1976 | Braun et al. . | |
| 4,758,101 | 7/1988 | Roof, Sr. et al. . | |
| 5,180,231 | 1/1993 | Ueno et al. | 384/909 |

OTHER PUBLICATIONS

Page from sales brochure of SKF GmbH, Schweinfurt, Fed. Rep. of Germany (no date).
Page from sales brochure of Dodge Division, Reliance Electric Company, Cleveland, Ohio (no date).
Pages (2) from sales brochure of The Torrington Company, Torrington, Conn. (1992).
A portion of an undated publication of Amoco Performance Products entitled "Polysulfone Design Engineering Data" (no date).
Photographs of a polymer pillow block with raised lettering "Australia" (no date).

Primary Examiner—Lenard A. Footland
Attorney, Agent, or Firm—John C. Bigler

[57] ABSTRACT

A one-piece body portion injection molded of polysulfone or similar polymer has mounting portions for securing the bearing housing to a support surface and a transverse bore having a spherically concave annular bearing seat for tiltably supporting a convex outer ring of a bearing. Diametrically opposed axially extending recesses within the bearing seat facilitate insertion of the outer race ring after molding of the body portion. The bearing housing has significantly improved stiffness and resistance to moisture, creep, thermal deflection, chipping and corrosion, making the bearing housing particularly suited for use in the food processing industry.

14 Claims, 4 Drawing Sheets

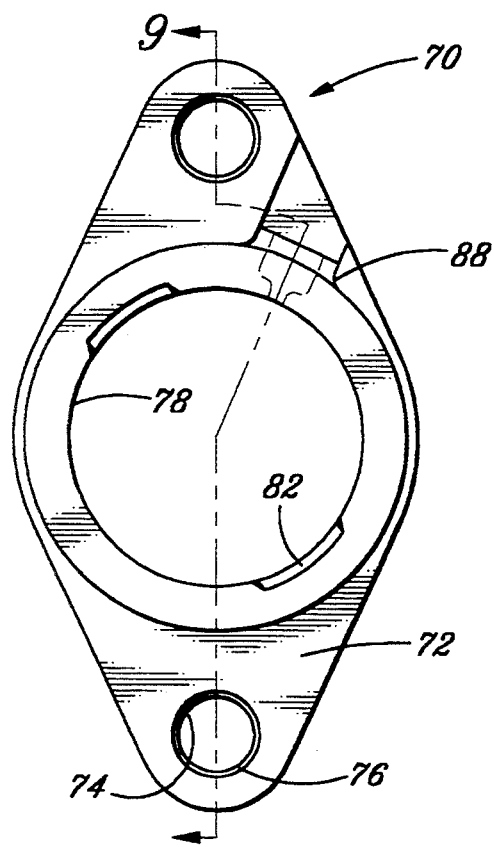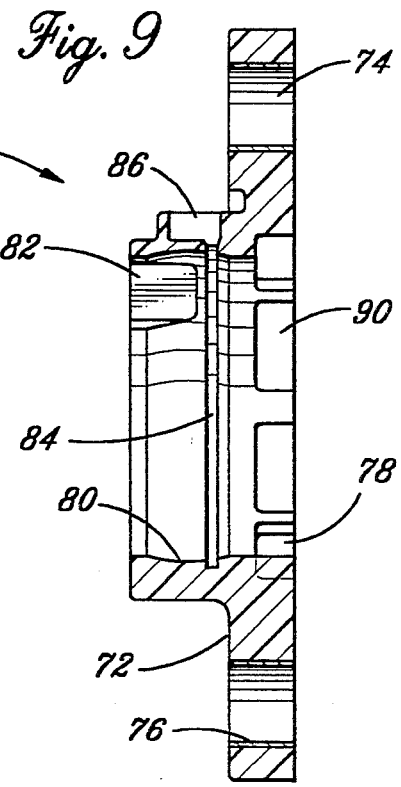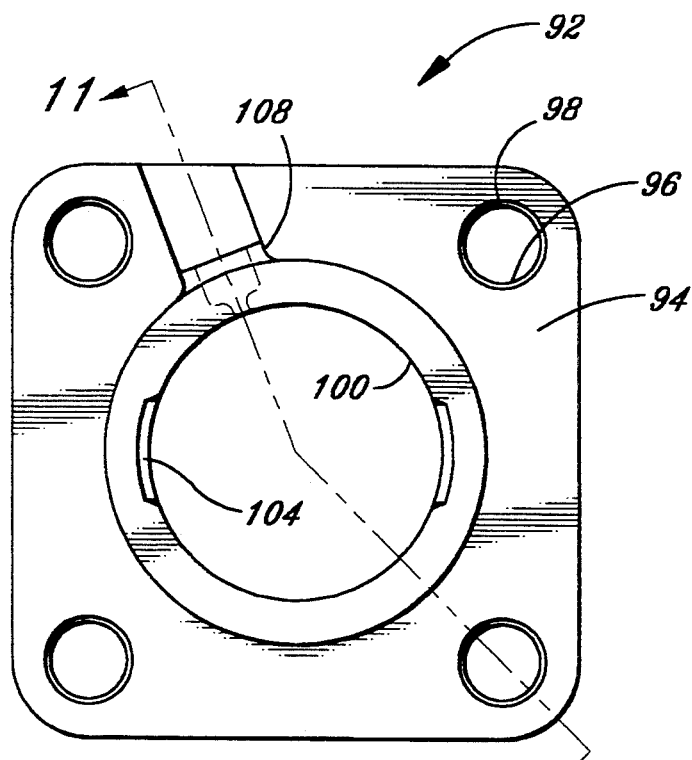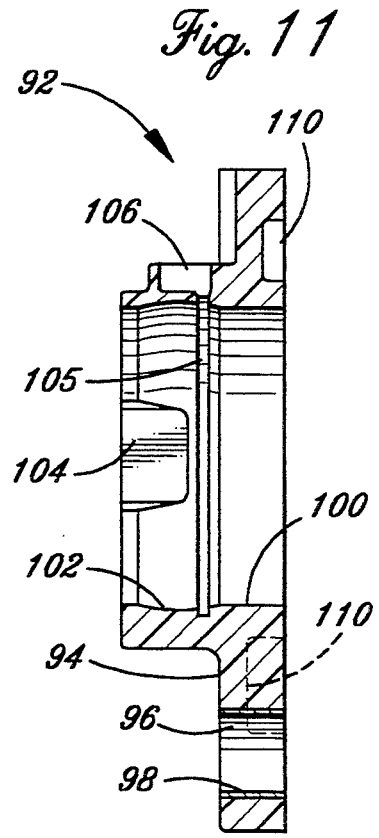

5,433,530

POLYMER BEARING HOUSING

This application is a continuation-in-part of application Ser. No. 07/954,774, filed Sep. 30, 1992, abandoned.

BACKGROUND OF THE INVENTION

This invention relates generally to bearing housings for rotary bearings and, more particularly, to housings for self-aligning anti-friction ball and roller bearings.

To accommodate misalignment of a shaft mounted within anti-friction bearings, the outer ring of the bearings may be formed with an outer spherically convex surface for mating engagement with a spherically concave surface of a housing in which the bearings are supported. Such bearing housings may be of the pillow block type, having an upper bight portion and a lower portion with outturned apertured mounting feet, or of a flange type configuration.

In some bearing housing applications, such as for example in food processing, bearing housings are continually subjected to corrosive chemicals, extreme changes in temperature, and high pressure steam. Historically, to withstand those conditions, such bearing housings have been made of cast iron and plated with nickel, or cast and machined of stainless steel, resulting in high manufacturing cost.

Even when made of nickel plated iron, bearing housings may rust due to chipping of the nickel plating during installation of the bearing housing or due to peeling or other damage to the nickel plating during repeated exposure to high pressure steam or other adverse conditions. Another problem associated with bearing housings made of nickel plated iron is the cost of proper environmental disposal of manufacturing bi-products.

Pillow blocks and other bearing housings made of glass reinforced nylon or similar polymers have been proposed for some applications. However, although those materials resist corrosion, bearing housings made of those materials do not have adequate stiffness and long term retention torque to prevent spinning of the bearing in the housing. Also, they are not sufficiently resistant to creep, moisture absorption, and thermal deflection to permit their use in the applications described above and are not generally approved for use in food processing.

To provide the spherically concave bore of bearing housings made of iron or steel, machining has been used. Alternatively, two-piece bearing housings made of glass reinforced nylon have been proposed with multiple shell sections that are guided by grooves or dove tails to clamp the bearing in a bearing seat. Molding or casting of the spherically concave bore as a finished one-piece bearing housings made of either iron, steel, or glass reinforced nylon has not been practical.

The foregoing illustrates limitations known to exist in present bearing housings. Thus, it is apparent that it would be advantageous to provide an alternative directed to overcoming one of more of the limitations set forth above. Accordingly, a suitable alternative is provided including features more fully disclosed hereinafter.

SUMMARY OF THE INVENTION

In one aspect of the present invention, this is accomplished by providing a polymer bearing housing having a significantly improved combination of stiffness, retention torque, and resistance to moisture, creep, thermal deflection, chipping and corrosion. The bearing housing comprises a one-piece body portion injection molded of a material selected from the group consisting essentially of polysulfones, polyetheretherketones and polyphthalamides. The body portion has mounting portions adapted for securing the bearing housing to a support surface and a transverse bore having a spherically concave annular bearing seat for tiltably supporting a convex outer ring of a bearing. Diametrically opposed axially extending recesses within the bearing seat facilitate insertion of the outer race ring after molding of the body portion.

The foregoing and other aspects will become apparent from the following detailed description of the invention when considered in conjunction with the accompanying drawing figures.

BRIEF DESCRIPTION OF THE DRAWING FIGURES

FIG. 8 is a front view illustrating a third embodiment of the polymer bearing housing of the present invention;

FIG. 9 is a sectional view of the embodiment of FIG. 8, taken along the line 9—9 of FIG. 8;

FIG. 10 is a front view illustrating a fourth embodiment of the polymer bearing housing of the present invention; and FIG. 11 is a sectional view of the embodiment of FIG. 10, taken along the line 10—10 of FIG. 10.

In this specification, identical elements in different embodiments are given identical reference characters.

DETAILED DESCRIPTION

Figure 1:
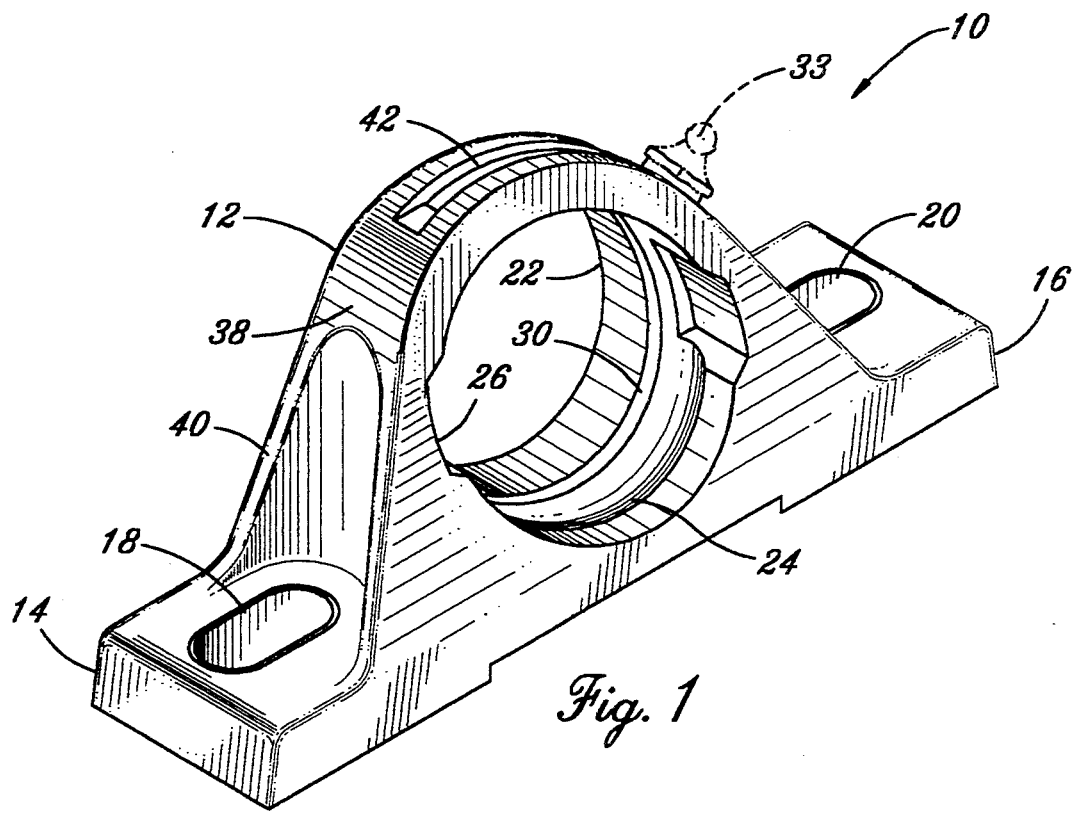
FIG. 1 is pictorial view illustrating an embodiment of the polymer bearing housing of the present invention, showing the top, left end and front thereof.
Figure 2:
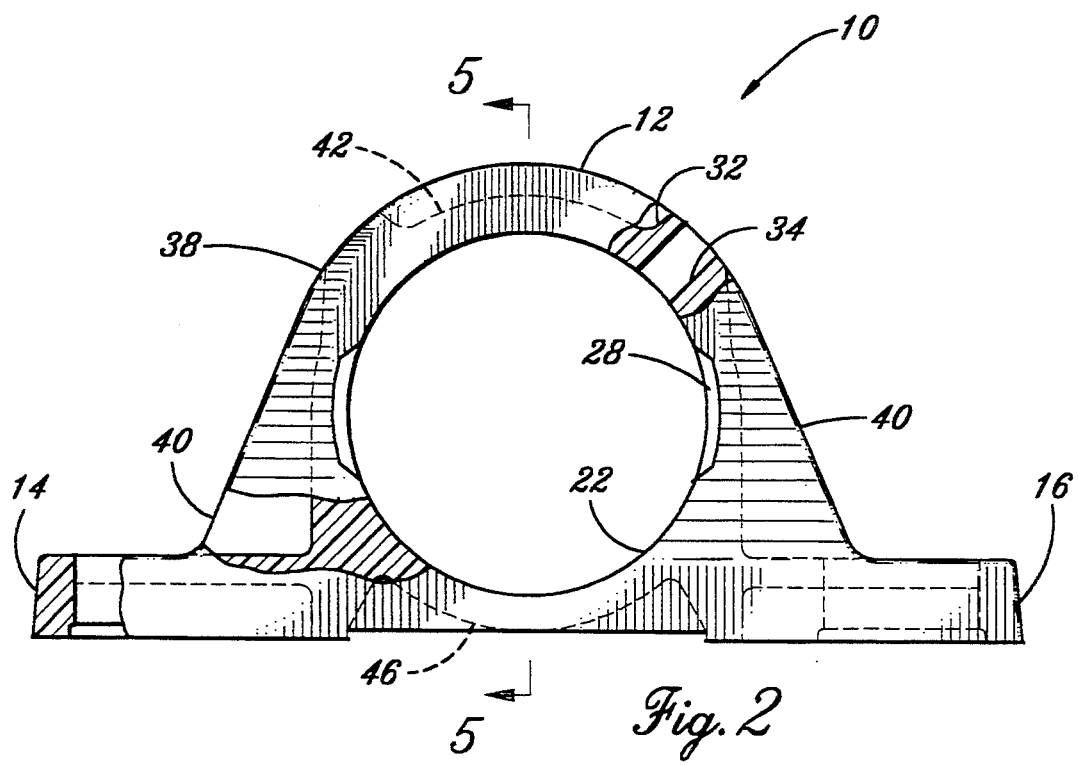
FIG. 2 is a front view, partially in section, of the embodiment of FIG. 1.
Figure 3:
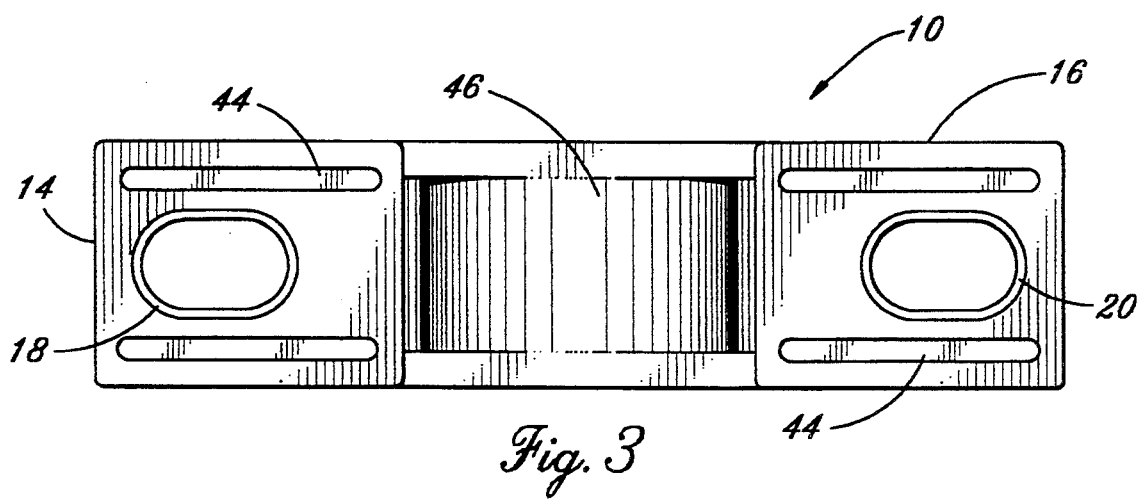
FIG. 3 is a bottom view of the embodiment of FIG. 1.
Figure 4:
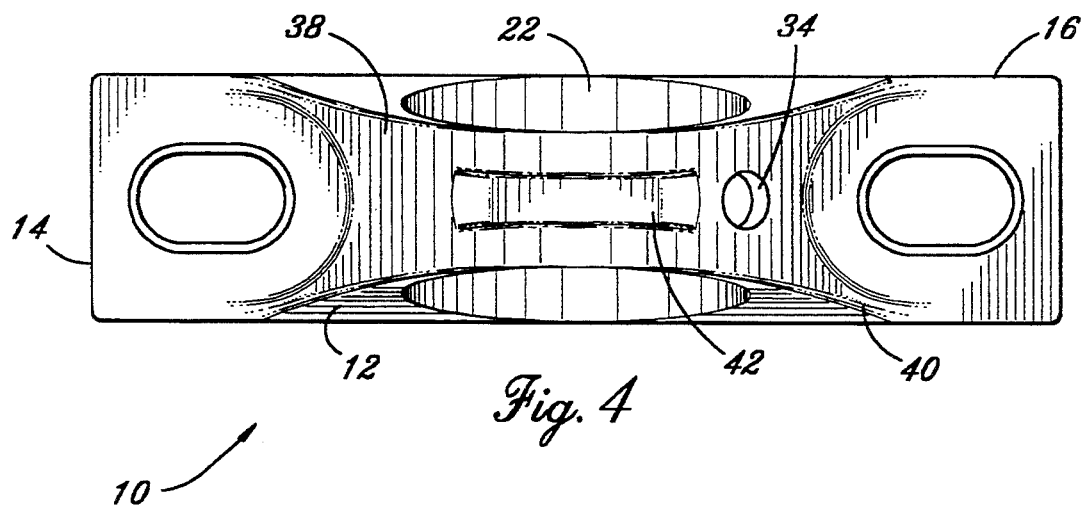
FIG. 4 is a top view of the embodiment of FIG. 1.

Referring now to the drawings, FIGS. 1 through 5 illustrate a bearing housing 10 of the pillow block type having a one-piece body portion formed with upper bight portion 12 and lower outturned mounting feet 14 and 16 with mounting apertures for securing bearing housing 10 to a support surface. The mounting apertures are elongated slots with stainless steel mounting bushings 18 and 20 (FIGS. 1 and 3) forming an interference fit therein to resist breakage of mounting feet 14 and 16 upon over tightening of bolts or other mounting fasteners.

Figure 5:
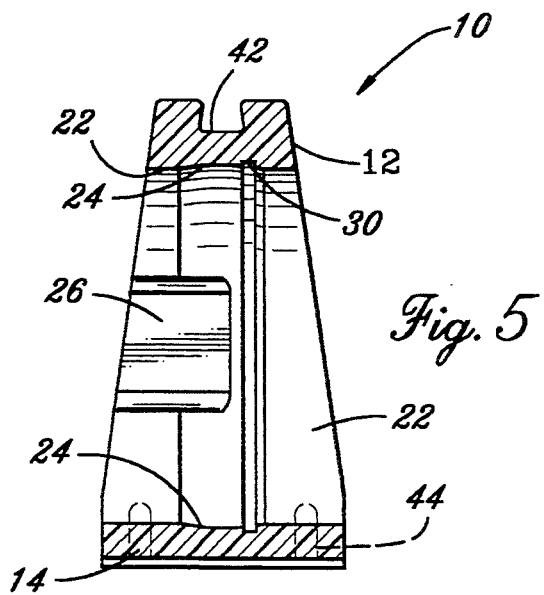
FIG. 5 is a sectional view of the embodiment of FIG. 1 taken along the line 5—5 of FIG. 2.

Bight portion 12 is formed with transverse bore 22 having spherically concave annular bearing seat 24 for mating engagement with an outer spherically convex surface of the outer ring of a bearing, not shown. Bearing seat 24 tiltably supports the outer ring of the bearing and provides self-alignment of the bearing to permit misalignment of bearing housing 10 with respect to a shaft supported by the bearing. As illustrated in FIG. 5, bearing seat 24 is an annular segment of a sphere coaxial with transverse bore 22 and having a diameter somewhat larger than the diameter of transverse bore 22.

Bearing seat 24 includes diametrically opposed axially extending loading recesses 26 and 28 which have a height corresponding to the thickness of the outer ring of the bearing. The radial depth of loading recesses 26 and 28 is sufficient to permit the bearing to be tilted 90 degrees with respect to its normal installed position and loaded into bearing housing 10. Upon subsequent rotation of the bearing to its normal installed position, the outer ring of the bearing forms an interference fit with bearing seat 24 and is restrained axially by the axially decreasing diameter of the spherically concave surface.

Bearing seat 24 includes annular relubrication groove 30 (FIGS. 1 and 5) to provide lubricant to balls or rollers of the bearing via small apertures within the outer ring of the bearing positioned over relubrication groove 30. Bight portion 12 includes integral mounting pad 32 with relubrication aperture 34 (FIGS. 2 and 4) adapted to receive grease fitting 34 (FIG. 1). Relubrication groove 30 is in fluid communication with relubrication aperture 34 and is axially rearward of loading apertures 26 and 28 to restrict the path of lubricant.

Because loading apertures 26 and 28 are at the front of bearing housing 10, particular mounting locations may require a "right" or "left" bearing housing configuration to permit convenient relubrication of the bearing as well as convenient replacement of the bearing. Bight portion 12 includes integral alternate mounting pad 38 (FIGS. 1, 2 and 4) for mounting grease fitting 33 to provide a "left" location for relubrication of the bearing.

Bearing housing 10 includes strengthening ribs 40 that extend laterally outward from bight portion 12 and partially encircle the mounting apertures of mounting feet 14 and 16 but leave sufficient space for mounting bolts, wrenches and other fastening means. As illustrated in FIG. 5, bight portion 12 is recessed axially with respect to the base of mounting feet 14 and 16 to permit a wrench or other tool to operate a set screw, cam or other locking device that may be provided to lock the bearing to a shaft.

Bearing housing 10 is particularly configured for strength and dimensional accuracy when formed by injection molding. Upper relief channel 42, lower relief channels 44, and cylindrical relief portion 46 serve to control cross sectional area of bearing housing 10. As a result, the body portion of bearing housing 10 can be injection molded as a finished pillow block, without requiring secondary machining operations, ready to receive the bearing, grease fitting 34, and mounting bushings 18 and 20.

Because the diameter of bearing seat 24 is larger than the entrance diameter of transverse bore 22, bearing housing 10 cannot be molded by traditional injection mold tooling and techniques. Bearing seat 24 must be made of relatively stiff material, causing bight portion 12 to break if traditional mold tooling were withdrawn axially after injection molding. Instead of traditional mold tooling, mold tooling with a collapsible core is used to injection mold the internal dimension of bearing seat 24 that is larger than the entrance opening to it.

The preferred material for the one-piece body portion of the bearing housing of the present invention is selected from the group consisting essentially of polysulfones, polyetheretherketones and polyphthalamides. Applicant has found that Udel P-1700, a polysulfone (with or without reinforcing fillers) supplied by Amoco Performance Products, is particularly suitable for the high performance bearing housing of the present invention. That material permits sterilizability and complies with food contact standards of the food processing industry.

Applicant's tests of the bearing housing of the present invention have determined that it has a significantly improved combination of the following properties: stiffness, long term retention torque, and resistance to moisture absorption, creep, thermal deflection, chipping and corrosion. Various modified endurance tests were conducted, comparing samples of the preferred embodiment described above with bearing housing samples made of glass reinforced nylon and cast iron. Performance criteria of the samples were measured as functions of applied radial load and test duration.

Significantly, Applicant discovered that the bearing housing of the present invention exhibited an acceptable loss in retention torque when subjected to large radial loads over extended periods of time. In contrast, bearing housings made of glass reinforced nylon, which had an initial retention torque slightly less than the preferred embodiment, lost nearly all retention torque when subjected to the same radial loads over the same periods of time. As a result, bearings in those bearing housings could be expected to rotate or spin with respect to the housing. Selected test results showing this dramatic difference are as follows:

| | | | POLYMER PILLOW BLOCK, BEARING RETENTION TORQUE | |
|---|---|---|---|---|
| | Bearing | Housing | Torgue (inch-lbs.) | |
| Elapsed Time | Number | Material | Horizontal | Vertical |
| Group 1 bearings, as installed | 447-91 | Udel* | 175-200 | 150-175 |
| | 448-91 | Nylon** | 150-175 | 150-175 |
| | 449-91 | Udel | 175-200 | 150-200 |
| | 450-91 | Nylon | 150-150 | 150-175 |
| Group 1 bearings after 254 hrs. of static and dynamic operation at radial loads up to 800 lbs. | 447-91 | Udel | 175-175 | 200-200 |
| | 448-91 | Nylon | 5-10 | 5-10 |
| | 449-91 | Udel | 125-150 | 125-125 |
| | 445-91 | Nylon | 5-10 | 5-10 |
| Group 2 bearings, as installed in the same housings as group 1 bearings | 555-91 | Udel | 150-175 | 150-150 |
| | 556-91 | Nylon | 10-25 | 10-25 |
| | 557-91 | Udel | 150-150 | 150-150 |
| | 558-91 | Nylon | 10-25 | 25-25 |
| Group 2 bearings after 104 hrs. of static and dynamic operation at radial loads of 800-1200 lbs. | 555-91 | Udel | 100-125 | 100-125 |
| | 556-91 | Nylon | 0-0 | 0-0 |
| | 557-91 | Udel | 90-100 | 90-100 |
| | 558-91 | Nylon | 5-5 | 5-5 |

*Udel GF120FG, food grade polysulfone with 20 percent glass reinforcement.
**Dupont Zytel 70G33, type 6/6 nylon with 33 percent glass reinforcement.

Figure 6:
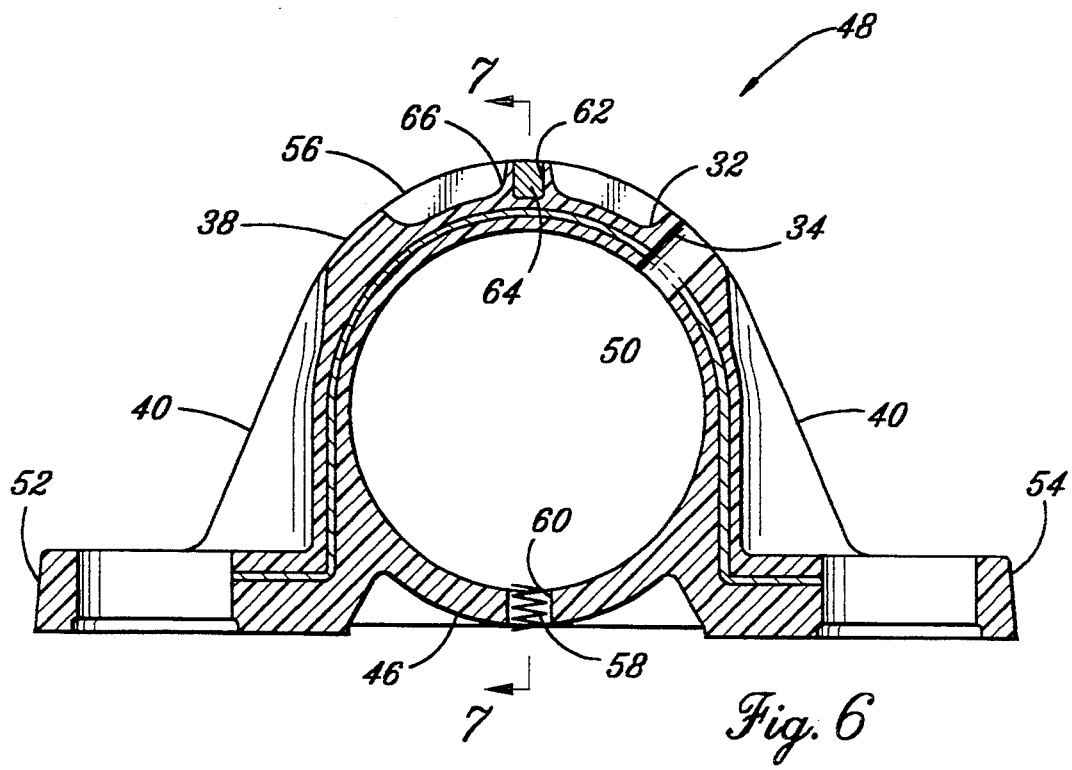
FIG. 6 is a cross sectional front view illustrating a second embodiment of the polymer bearing housing of the present invention.
Figure 7:
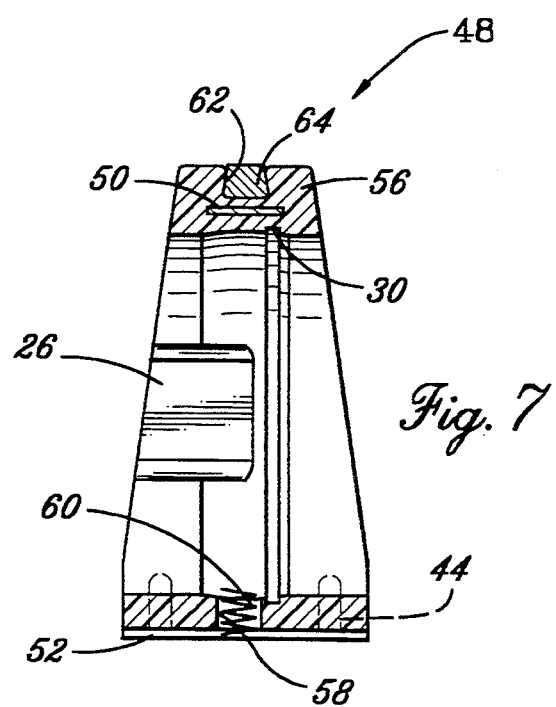
FIG. 7 is a sectional view of the embodiment of FIG. 6, taken along the line 7—7 of FIG. 6.

FIGS. 6 and 7 illustrate a second embodiment of the present invention incorporating additional features. Bearing housing 48 includes metallic strap 50 that is insert-molded within the body portion thereof. Metallic strap 50 extends between the mounting apertures of mounting feet 52 and 54 and through bight portion 56 to provide additional restraint of the outer race of the bearing and of a shaft upon which the bearing is mounted in the event of catastrophic bearing failure. Thus, metallic strap 50 may be considered a "fail safe" feature.

Bearing housing 48 also includes compression spring 58 for resiliently biasing both the outer race ring of the bearing and the support surface to provide electrical grounding of the bearing and of a shaft upon which the bearing is fitted. In place of compression spring 58, a blade type spring or other form of electrical contact ground means may be employed. The body portion of bearing housing 48 is formed with a grounding aperture 60, that may be offset axially as shown in FIG. 7 to avoid interference with relubrication groove 30.

Indicator cavity 62 may be provided at the top of bight portion 56, as illustrated in FIGS. 6 and 7, or at other readily observable locations to receive temperature indicating material 64. Various eutectic alloys, for example an alloy of 18.1 percent Bismuth, 36.2 percent Lead, and 45.7 percent Tin with a melting point of 305 degrees Fahrenheit, may be poured into indicator cavity 62 and allowed to solidify or may be placed in the cavity as a preformed pellet. Melting and flowing of such eutectic alloy with a preselected melting point provides a visual indication that the bearing is operating beyond its maximum operating temperature.

Other suitable temperature indicating materials are available commercially in pellet or label form that either melt or change color in response to attaining a preselected temperature. For example, TempilPellets, Tempilabels and Temp-Alarm devices available from the Tempil Division, Big Three Industries, Inc., may be used in place of the eutectic alloy previously described. Temperature indicating pad 66 may be formed with a channel to allow temperature indicating material 64 to flow out of indicator cavity 62 to enhance the visual change caused by the maximum operating temperature being reached.

FIGS. 8 and 9 illustrate a third embodiment of the present invention having a flange mount. Polymer bearing housing 70 has a one-piece body portion with flange 72, two diametrically opposed mounting apertures 74, and stainless steel mounting bushings 76. Transverse bore 78 has spherically concave annular bearing seat 80, diametrically opposed axially loading recesses 82, and relubrication groove 84. Relubrication aperture 86 on mounting pad 88 and molding relief portions 90 are also shown.

FIGS. 10 and 11 illustrate a fourth embodiment of the present invention showing that many variations of flange mount may be used. Polymer bearing housing 92 has a one-piece body portion with flange 94, four diametrically opposed mounting apertures 96, and stainless steel mounting bushings 98. Transverse bore 100 has spherically concave annular bearing seat 102, diametrically opposed axially loading recesses 104, and relubrication groove 105. Relubrication aperture 106 on mounting pad 108 and molding relief portions 110 are also shown.

From the above, it will be apparent that the present invention provides a finished injection molded pillow block requiring no secondary machining operations to form the spherically concave bearing seat. The minimal wall sections of the body portion ensure adequate heat dissipation. The polymer body portion and stainless steel mounting bushings resist moisture and a wide spectrum of chemicals without significant degradation and provide a virtually rust free bearing housing, even when surface chipping occurs. The bearing housing can be directly substituted for the nickel plated iron bearing housings presently used.

In addition, the polymer bearing housing of the present invention provides adequate strength to support loads up to the load limit of the inserted bearing and meets dimensional requirements. The polymer body portion can operate at sufficiently high temperatures with sufficient torque retention of the bearing and provides resistance to thermal deflection over a long service life. The bearing housing is easily moldable at a reasonable manufacturing cost. Integral "fail safe" metallic strap, relubrication fitting and groove, electrical grounding, and temperature indicating features may be incorporated.

Having described the invention, what is claimed is:

1. A bearing housing having stiffness, retention torque, and resistance to moisture absorption, creep, thermal deflection, chipping and corrosion, the bearing housing comprising:

a one-piece body portion injection molded of a material selected from the group consisting essentially of polysulfones, polyetheretherketones and polyphthalamides, said body portion being formed with mounting portions having mounting apertures adapted for securing the bearing housing to a support surface;

said body portion being formed with a transverse bore having a spherically concave annular bearing seat for tiltably supporting a convex outer ring of a bearing, said bearing seat including diametrically opposed axially extending recesses for facilitating insertion of the outer race ring into the bearing seat after molding of the body portion;

further comprising metallic reinforcement means within the mounting apertures for strengthening the mounting apertures and increasing stability of the bearing housing.

2. The bearing housing of claim 1, wherein the mounting apertures of the body portion are elongated slots for receiving mounting bolts and the metallic reinforcement means includes a metal bushing closely fitting within each of the elongated slots.

3. The bearing housing of claim 1, wherein the mounting portions comprise a flange and the mounting apertures are provided within the flange.

4. A bearing housing having stiffness, retention torque, and resistance to moisture absorption, creep, thermal deflection, chipping and corrosion, the bearing housing comprising:

a one-piece body portion injection molded of a material selected from the group consisting essentially of polysulfones, polyetheretherketones and polyphthalamides, said body portion being formed with mounting portions having mounting apertures adapted for securing the bearing housing to a support surface; and said body portion being formed with a transverse bore having a spherically concave annular bearing seat for tiltably supporting a convex outer ring of a bearing, said bearing seat including diametrically opposed axially extending recesses for facilitating insertion of the outer race ring into the bearing seat after molding of the body portion;

wherein the bearing seat includes an annular relubrication groove for supplying lubricant to relubrication apertures in the outer race ring and wherein the body portion includes relubrication means, in fluid communication with the annular relubrication groove, for receiving lubricant.

5. The bearing housing of claim 4, wherein the relubrication means includes at least one integrally molded pad having a relubrication aperture adapted to receive a grease fitting, the relubrication aperture being in fluid communication with the annular relubrication groove.

6. The bearing housing of claim 4, wherein the mounting portions comprise a flange and the mounting apertures are provided within the flange.

7. A bearing housing having stiffness, retention torque, and resistance to moisture absorption, creep, thermal deflection, chipping and corrosion, the bearing housing comprising:
- a one-piece body portion injection molded of a material that is essentially polysulfone, said body portion being formed with mounting portions having mounting apertures adapted for securing the bearing housing to a support surface; and
- said body portion being formed with a transverse bore having a spherically concave annular bearing seat for tiltably supporting a convex outer ring of a bearing, said bearing seat including diametrically opposed axially extending recesses for facilitating insertion of the outer race ring into the bearing seat after molding of the body portion.

8. The bearing housing of claim 7, wherein the mounting portions comprise a flange and the mounting apertures are provided within the flange.

9. The bearing housing of claim 11, said body portion being formed with an upper bight portion and lower mounting feet having said mounting apertures adapted for securing the bearing housing to a support surface.

10. The bearing housing of claim 7, wherein the mounting portions comprise a flange and the mounting apertures are provided within the flange.

11. The bearing housing of claim 7, wherein the material of the body portion further includes a filler for reinforcement.

12. A high performance pillow block bearing housing comprising:
- one-piece body portion injection molded of a material consisting essentially of polysulfone, said body portion being formed with an upper bight portion and lower mounting feet having mounting apertures adapted for securing the bed ring housing to a support surface;
- said bight portion being formed with a transverse bore having a spherically concave annular bearing Seat for tiltably supporting a convex outer ring of a bearing, said bearing seat including diametrically opposed axially extending recesses for facilitating insertion of the outer race ring into the bearing seat after molding of the body portion;
- further comprising metallic reinforcement means within the mounting apertures of the mounting feet, wherein the mounting apertures of the mounting feet are elongated slots for receiving mounting bolts and the metallic reinforcement means includes a metal bushing closely fitting within each of the elongated slots.

13. A high performance pillow block bearing housing comprising:
- a one-piece body portion injection molded of a material selected from the group consisting essentially of polysulfones, polyetheretherketones and polyphthalamides, said body portion being formed with an upper bight portion and lower mounting feet having mounting apertures adapted for securing the bearing housing to a support surface;
- said bight portion being formed with a transverse bore having a spherically concave annular bearing seat for tiltably supporting a convex outer ring of a bearing, said bearing seat including diametrically opposed axially extending recesses for facilitating insertion of the outer race ring into the bearing seat after molding of the body portion, wherein the bearing seat includes an annular relubrication groove for supplying lubricant to relubrication apertures in the outer race ring and wherein the body portion includes relubrication means, in fluid communication with the annular relubrication groove, for receiving lubricant.

14. The bearing housing of claim 13, wherein the relubrication means includes at least one integrally molded pad having a relubrication aperture adapted to receive a grease fitting, the relubrication aperture being in fluid communication with the annular relubrication groove.

* * * * *